United States Patent [19]

Isayev et al.

[11] Patent Number: 4,835,047
[45] Date of Patent: May 30, 1989

[54] WHOLLY AROMATIC POLYESTER FIBER-REINFORCED POLYETHERIMIDE COMPOSITE AND PROCESS FOR PREPARING SAME

[76] Inventors: Avraam Isayev, 2399 Sourek Rd., Akron, Ohio 44313; Suresh Swaminathan, 557 E. Buchtel Ave., Apt. 3, Akron, Ohio 44304

[21] Appl. No.: 50,705

[22] Filed: May 14, 1987

[51] Int. Cl.$^4$ .................. B05D 3/00; C08L 67/00
[52] U.S. Cl. .................. 428/294; 428/473.5; 525/425; 525/436; 264/108
[58] Field of Search .................. 525/425, 436; 252/299.01, 299.6; 264/108; 428/294, 473.5

[56] References Cited

U.S. PATENT DOCUMENTS

| | | |
|---|---|---|
| 3,991,014 | 11/1976 | Kleinschuster . |
| 4,067,852 | 1/1978 | Calundann . |
| 4,083,829 | 4/1978 | Calundann et al. . |
| 4,130,545 | 12/1978 | Calundann . |
| 4,161,470 | 7/1979 | Calundann . |
| 4,250,279 | 2/1981 | Robeson et al. ............... 525/425 |
| 4,318,842 | 3/1982 | East et al. . |
| 4,438,236 | 3/1984 | Cogswell et al. ............... 525/425 |
| 4,468,364 | 8/1984 | Ido . |
| 4,567,227 | 1/1986 | Kiss ............................... 525/425 |
| 4,728,698 | 3/1988 | Isayev et al. ................... 525/439 |

FOREIGN PATENT DOCUMENTS

0217563A2 4/1987 European Pat. Off. .

OTHER PUBLICATIONS

"Anisotropic Polymers, Their Synthesis and Properties", Reprinted from Proceedings of The Robert A. Welch Conferences on Chemical Research XXVI, Synthetic Polymers, 1982.
Modern Plastics Encyclopedia, pp. 468, 469.

*Primary Examiner*—John C. Bleutge
*Assistant Examiner*—A. Carrillo

[57] ABSTRACT

Novel self-reinforced polymer composites of polyetherimide and a melt processable wholly aromatic polyester are prepared according to this invention. The wholly aromatic polyester exhibits anisotropic properties in the melt phase. Mixing is carried out at a temperature at which both the polyetherimide and the wholly aromatic polyester are melt processable. The products of this invention comprise about 35 to 95 percent by weight of wholly aromatic polyester, which is in the form of predominantly unidirectionally oriented continuous fibers primarily in the range of about 1 to 10 micrometers in diameter, distributed in a matrix of polyetherimide. The polymer composites of this invention have high tensile strength, high modulus, satisfactory elongation, good impact strength, and good high temperature properties.

15 Claims, 2 Drawing Sheets

WHOLLY AROMATIC POLYESTER FIBER-REINFORCED POLYETHERIMIDE COMPOSITE AND PROCESS FOR PREPARING SAME

FIELD OF THE INVENTION

This invention relates to self-reinforced polymer composites and processes for making the same, and more particularly to novel self-reinforced polymer composites comprising polyetherimide and a melt processable wholly aromatic polyester which serves as the reinforcing agent and to processes for making the same.

BACKGROUND ART

Fiber-reinforced polymer composites are well known and widely used. Polymers of improved strength and increased stiffness can be obtained by the use of an appropriate reinforcing fiber. Probably the most widely used reinforcing fibers are glass, carbon and aramid (or "Kevlar" which is a registered trademark of the E. I. du Pont de Nemours & Co., Wilmington, Del.)

The base polymers used in making reinforced polymer composites such as those described above include a wide range of thermoplastics, such as polyethylene, polystyrene and copolymers thereof, polyamides, polycarbonates, polyetherimide and polyesters such as polybutyl terephthalate. These polymers are thermoplastics and are either amorphous or semi-crystalline. They may be called flexible chain polymers, since individual monomer units in the polymer chain are free to rotate with respect to each other so that the polymer chain may assume a random shape.

More recently developed are self-reinforced polymer composites comprising long, continuous, predominantly unidirectionally oriented fibers of a melt processable wholly aromatic polyester in a matrix of a thermoplastic flexible chain polymer. Such polymer composites are described in the co-pending, commonly assigned, U.S. patent application of Avraam Isayev and Michael J. Modic, Ser. No. 901,573, filed Aug. 29, 1986, now U.S. Pat. No. 4,728,698, issued Mar. 1, 1988. As described therein, the fibers of the wholly aromatic polyester, which may also be termed a thermotropic liquid crystal polymer (LCP) are formed in situ by mixing the matrix of base polymer with the wholly aromatic polyester in a suitable mixing and extrusion apparatus, as for example an extruder-static mixer setup, or a twin screw extruder. Polymer composites specifically disclosed therein are polycarbonate/LCP composites containing from 2.5 to 50 weight percent of LCP, and polyetherimide/LCP composites containing from 5 to 30 percent by weight of LCP. Polycarbonate/LCP composites exhibited long continuous fiber structure only in compositions containing 2.5, 5 or 10 percent by weight of LCP; compositions containing either 25 or 50 percent of LCP did not exhibit long continuous LCP fibers and had inferior mechanical properties. On the other hand, polyetherimide/LCP composites had long continuous LCP fibers over the entire composition range tested (5 to 30 weight percent of LCP). The highest tensile strength realized in any of those blends was 151 mega pascals (MPa) (in a blend containing 10 percent by weight of LCP). Tensile modulus (in giga pascals, or GPa) appear to rise continuously with increasing LCP content, although the rate of increase appeared to level off or decay between 20 and 30 percent by weight of LCP. Maximum impact strength was achieved at 10 percent LCP loading, and composites containing either 20 or 30 percent by weight of LCP had lower impact strengths than did composites containing 10 percent LCP. In short, some of the physical properties of polyetherimide/LCP composites described therein were in general superior to those of pure polyetherimide, but nevertheless fell short of the properties required in some high performance applications.

DISCLOSURE OF THE INVENTION

Applicants have found, surprisingly and unexpectedly, that greatly improved physical properties are obtained in wholly aromatic polyester fiber-reinforced polyetherimide composites if the proportion of wholly aromatic polyester is increased and conversely the proportion of polyetherimide is decreased, compared to the levels described in the aforesaid U.S. Pat. No. 4,728,698.

This invention provides self-reinforced polymer composites comprising (a) from about 65 to about 5 percent by weight, based on total polymer weight, of polyetherimide, and (b) from about 35 to about 95 percent by weight, based on total polymer weight, of a melt processable wholly aromatic polyester, said polyester being essentially in the form of long, continuous, predominantly unidirectionally oriented fibers which are formed in situ in a matrix of said polyetherimide. The amount of wholly aromatic polyester is preferably from about 40 to about 75 percent by weight, based on total polymer weight.

BEST MODE FOR CARRYING OUT THE INVENTION

Figure 1:
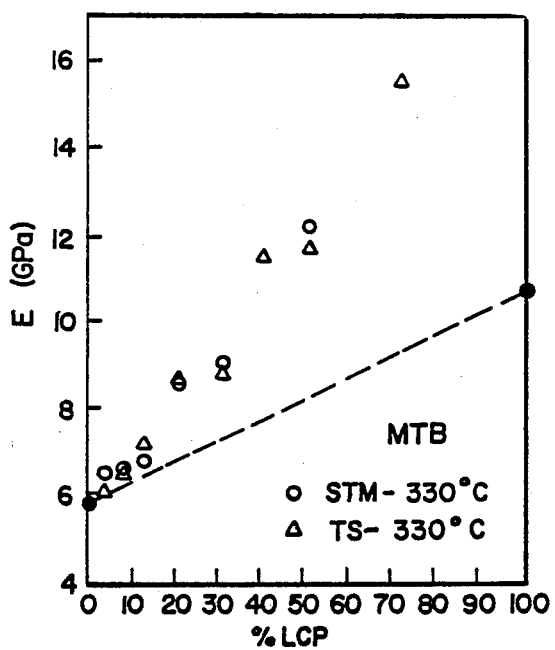
FIGS. 1, 2 and 3 show, respectively, tensile modulus at 1 percent elongation, tensile strength (ultimate strength) and notch Izod impact strength, all as a function of the weight percentage of wholly aromatic polyester.

The required starting materials for preparing the novel polymer composites of this invention are polyetherimide and a melt processable wholly aromatic polyester. Novel polymer compositions according to this invention are prepared by mixing from about 65 to about 5 percent by weight of polyetherimide with from about 35 to about 95 percent by weight of a melt processable wholly aromatic polyester at a temperature at which both polymers are melt processable, extruding the resulting blend in the melt phase, cooling the blend, and recovering a polymer composite according to the invention.

Polyetherimide is an amorphous, high-performance engineering thermoplastic characterized by high heat resistance, high strength and modulus, good electrical properties and reasonably easy processability. This polymer is a flexible chain polymer by virtue of ether linkages in its molecular structure. Polyetherimide is available commercially from General Electric Company in both unreinforced and glass fiber-reinforced grades under the trademark "ULTEM". The unreinforced grades are suitable starting materials for the practice of the present invention. Polyetherimide is briefly described (including chemical structure) in "Modern Plastics Encyclopedia 1984-1985", page 58, published by McGraw Hill, Inc., New York, N.Y.

The polyester starting materials are melt processable wholly aromatic polyesters such as those described in U.S. Pat. Nos. 3,991,014; 4,067,852; 4,083,829, 4,130,545; 4,161,470; 4,318,842; and 4,468,364, and in G. W. Calundann et al, "Anisotropic Polymers, Their Synthesis and Properties", reprinted from the Robert A. Welch Conferences on Chemical Research, XXVI Synthetic Polymers, Nov. 15-17, 1982, Houston, Tex., pp 247-291. The melt processable or thermotropic, polyester may also be described as a liquid crystal polymer (LCP) since it exhibits anisotropy even in the melt phase.

The wholly aromatic polyester must be matched or paired with the polyetherimide so that the two have overlapping processing temperatures. That is, the melting point of the wholly aromatic polyester must be within the melt processing temperature range of the polyetherimide.

One series of particularly suitable polymer compositions or composites according to the present invention are those made from a polyetherimide as the base polymer and a wholly aromatic polyester thermotropic liquid crystal polymer having a melting point of about 275° C. and supplied by Celanese Research Company, Summit, N.J. under the designation "Vectra A950" (formerly "LCP-2000"). This polymer is believed to consist essentially of about 25-30 mole percent of 6-oxy-2-naphthoyl moieties and about 70-75 mole percent of p-oxy-benzoyl moieties, as described for example in U.S. Pat. No. 4,161,470 and in example 4 of U.S. Pat. No. 4,468,364.

The amount of wholly aromatic polyester in the final product is from about 35 to about 95 percent by weight, preferably from about 40 to about 75 percent by weight, especially from about 50 to about 75 percent by weight, based on the combined weight of the base polymer and the wholly aromatic polyester.

Surprisingly, long continuous fibers of the polyester are formed during mixing of the polyester with polyetherimide, even at high polyester loadings. For example, even in polymer composites containing 70 percent by weight of wholly aromatic thermotropic polyester and conversely 30 percent by weight of polyetherimide, the product consists essentially of long continuous polyester fibers in a matrix of polyetherimide, provided that proper mixing conditions are observed. More will be said subsequently about proper mixing conditions.

Additional materials are not required but may be present. Thus, it is within the scope of the invention to prepare a mixed composite polymer by inclusion of an additional reinforcing fiber, such as glass, carbon, or aramid, in addition to the wholly aromatic polyester. The additional reinforcing fiber may be incorporated into either the base polymer or the polyester. The additional reinforcement provided by the additional fiber is not necessary in most cases, but where a very high stiffness (or very high strength) reinforced polymer composite is desired, such can be attained according to the present invention without the high loadings of conventional reinforcing fiber required in presently known conventional polymer/fiber composites.

Other additives, such as pigments and fillers, coupling agents, flame retardants, lubricants, mold release agents, plasticizers and ultraviolet stabilizers, may be mixed with the base polymer and wholly aromatic polyester as desired. The use of such additives is well known in the polymer processing art.

The polyetherimide and the wholly aromatic polyester are mixed at ambient temperature to form a physical mixture. Any additional ingredients which are desired in the final product may also be mixed in at this time. The physical mixture is then dried under conventional conditions, e.g. at temperatures of about 100° to about 150° C. for approximately 6 to 24 hours, in a vacuum oven. The dry blended polymers (and additives, if any) are then thoroughly mixed at a temperature above the melting point of both polymers in a suitable mixing apparatus which will give thorough mixing sufficient to cause fiber formation. The blend may be melt processed at a temperature within the range of about 300° C. to about 350° C. The mixing apparatus may be, for example, a single screw extruder in series with a suitable static mixer or a twin screw extruder. Other mixing apparatus will be apparent to those skilled in the art. The blend is then extruded in the form of a strand, which upon solidification, may be chopped into pellets.

Preferred mixing apparatus includes an extruder, static mixer and extrusion die through which blends of the base polymer and the liquid crystal polymer are extruded. Good results have been obtained by using a single screw extruder having four (4) heating sections in series with a heated six-element Koch mixer (a static mixer), with an adapter between the extruder and the Koch mixer, and a discharge die having a 1/16 inch (in diameter) opening on the outlet side of the Koch mixer.

Good results have also been obtained with a twin screw extruder. The twin screw extruder used herein was a ZSK 30 twin screw extruder, having 30 mm diameter co-rotating twin screws, capable of rotating at speeds up to 500 rpm, sold by Werner and Pfleiderer Corp., Ramsey, N.J. The rpm used in the present case, however, was 200. The twin screw extruder used had five independently controllable heating zones in series. In experiments herein, the first zone was maintained at about 280° C., and the other four zones were maintained at about 310° to about 330° C.

The processing temperature is the temperature at which both polymers are melt processable, i.e. a temperature at which the polyetherimide is either melted or sufficiently soft to be processed in ordinary mixing apparatus and at which the wholly aromatic polyester is above its melting point. The ingredients are brought up to processing temperature at the beginning of the mixing operation and are thereafter maintained in the desired temperature range. In the case of the preferred apparatus, the ingredients are brought up to temperature near the feed end of the single screw extruder and are thereafter maintained at appropriate processing temperature by appropriate controls of the vaious independently adjustable heating sections.

The product polymer composition or blend is a self-reinforced polymer composite in which polyetherimide is the matrix and the wholly aromatic polyester is in the form of predominantly unidirectionally oriented long continuous fibers or strands, oriented in the direction of extrusion. Fiber diameters are predominantly less than 10 microns, primarily in the range of about 1 micron to about 10 microns, although fibers of other diameters can be obtained. The polymer composite is characterized as self-reinforced because the wholly aromatic fibers are formed in situ during the mixing process rather than being fed to the mixing apparatus as solid fibers. The proportions of ingredients in the polymer composite are essentially the same as in the feed.

The product polymer composite may be further processed as desired. For example, the polymer composite may be pelletized and then formed into shaped articles, tapes, films or fibers. This shaping may be accomplished by conventional means such as extrusion, injection molding, etc. Molded composite articles may be formed of injection molding. Films may be formed by conventional means such as melt extrusion or casting. Fibers may be formed by conventional melt spinning techniques. Polymer composites of this invention are especially suitable for injection molding.

Products of the present invention exhibit exceptional mechanical properties, including tensile modulus, tensile strength and notched Izod impact strength. Mechanical properties, especially tensile modulus and tensile strength, are significantly higher than those of the polyetherimide/wholly aromatic polyester composites described in co-pending application, Ser. No. 901,573, in which the amount of wholly aromatic polyester may range from about 5 to about 30 percent by weight, based on total polymer weight. Mechanical properties of the present polymer composites, for the most part, are well above the values which would be predicted from the Rule of Mixtures. The discussion of the Rule of Mixtures can be found in Lawrence E. Nielsen, "Mechanical Properties of Polymers and Composites", vol 2, Marcel Dekker, Inc., New York 1974; pages 455 and 465 are of particular interest. Also surprising and unexpected is the fact that polyetherimide/wholly aromatic polyester blends of this invention are in the form of composites in which the wholly aromatic polyester is in the form of long continuous, predominantly unidirectionally oriented fibers, because blends of polycarbonate with the same wholly aromatic polyesters did not exhibit a fiber structure even at 25 percent by weight of the wholly aromatic polyester.

Polymer composites of this invention are also characterised by high heat resistance and good electrical properties which remain stable over a wide range of temperatures and frequencies. Polymer composites of this invention also have good flame resistance.

Polymer composites of this invention are especially useful in high performance applications where high tensile strength, high modulus and good impact resistance are required or at least highly desirable. These products are particularly useful in various electrical, electronics, aerospace and automotive applications. In particular, polymer composites of this invention are useful in automotive and aerospace applications as replacements for present composite components which are produced by sheet molding compound technology. Products of this invention can be produced at faster rates and with less power consumption, resulting in lower product costs, compared to conventional composites in which fibers are prepared in advance. The additional step involving fiber preparation, the cost of machinery and the time required to prepare fibers are avoided.

This invention will now be further described in detail with reference to the specific examples that follow. It will be understood that these examples are by way of illustration of the invention and not by way of limitation of the scope thereof.

Polyetherimide used in the examples was sold under the name "ULTEM 1000" by General Electric Company, Schenectady, N.Y.

The melt processable wholly aromatic polyester used in the examples was a thermotropic polymer supplied by the Celanese Research Company, Summit, N.J. under the designation "Vectra A950". This polymer has a melting point of 275° C. and is believed to consist essentially of about 25–30 mole percent of 6-oxy-2-naphthoyl moieties and 70–75 mole percent of p-oxybenzoyl moieties.

The apparent viscosity ratio of polyetherimide melt to "Vectra A950" melt was about 67.4 at 310° C. at a shear rate of 118 sec.$^{-1}$. This ratio increases as the shear rate increases.

EXAMPLE 1

Mixtures of polyetherimide ("Ultem 1000") and wholly aromatic polyester ("Vectra A950") were prepared by dry mixing pellets of the two polymers at ambient temperature to form a physical mixture, and drying this mixture at 110° C. for 24 hours in a vacuum oven. The dry pellet mixture was charged to a ZSK 30 twin screw extruder, sold by Werner and Pflieiderer Corp., of Ramsey, N.J. This extruder had two co-rotating screws, both rotated at 200 rpm, and five heating zones. The first zone (at the inlet end) was maintained at 280° C., the other zones at either 310° or 330° C. The polymer blend was extruded as thin rods, which were quenched with water at ambient temperature. The quenched rods were pelletized. The pellets were fed to a Newbury Model H2 40RS injection molding machine which was operated under the following process conditions:

| Barrel temperature | |
|---|---|
| Rear Zone: | 290° C. |
| Middle Zone: | 325° C. |
| Front Zone: | 325° C. |
| Nozzle temp. setting | 100% |
| Mold temperature | 150° C. |
| Screw speed setting (max.) | 11.0 |
| Injection speed setting (max.) | 11.0 |
| Injection pressure | 2600 psi |
| Secondary Injection pressure | 750 psi |
| Back pressure | 150 psi |
| Overall Injection time | 4 sec. |
| Secondary Injection time | 3 sec. |
| Cycle time | 30 sec. |

Samples of the injection molded blends described herein were observed in a Scanning Electron Microscope (SEM) model ISI-SX-40 (International Scientific Instruments) and were found to be in the form of fibers of predominantly 3 to 5 microns in diameter. These fibers were oriented essentially in the direction of molding, were well distributed across the surface of the material, and were nearly continuous in length.

Injection molded samples of each polymer blend were subjected to impact and stress-strain tensile tests.

Impact tests were carried out according to ASTM method D 235 C, using dumbell shaped samples, (standard tensile bars) 6.3 cm in length and having notches 0.125 inch (about 0.32 cm) in width, and using 2.0 lb. and 5.0 lb. pendulums. Impact strengths, in joules per meter (J/m) and foot-pounds of force per inch (ft-lb/in) of notch, were found to be as shown in TABLE I below.

Tensile strength (in MPa) and modulus (in GPa) were measured using a Monsanto tensile tester, Model T-10, on mini tensile bars (0.625×0.123×0.06 inch) obtained from injection molding. Results are given in TABLE I below.

Samples of pure polyetherimide (PEI) and pure wholly aromatic polyester (LCP) were injection molded in the same manner. Results for the minitensile bars are given in TABLE I below. In this table, tensile modulus was measured at 1 percent strain, tensile strength was measured at maximum stress (which occurred at break for all materials except pure polyetherimide), and elongation was measured at break.

TABLE I

| Wt. Percent LCP | Tensile Modulus, GPa | Tensile Strength MPa | Elongation to break % | Izod Impact Ft-Lb/In | Izod Impact J/m |
|---|---|---|---|---|---|
| 0 | 5.70 | 114.5 | 25.37 | 0.53 | 15.5 |
| 10 | 6.93 | 78.4 | 1.59 | 0.87 | 25.4 |
| 20 | 8.68 | 92.4 | 1.07 | 0.92 | 26.7 |
| 30 | 8.72 | 102.0 | 1.23 | 0.76 | 22.1 |
| 40 | 11.40 | 140.2 | 1.69 | 1.07 | 31.1 |
| 50 | 11.50 | 157.0 | 2.23 | 2.47 | 71.9 |
| 70 | 15.40 | 201.2 | 2.24 | 12.61 | 366.6 |
| 100 | 10.50 | 175.0 | 3.26 | 9.9 | 287.4 |

Figure 2:
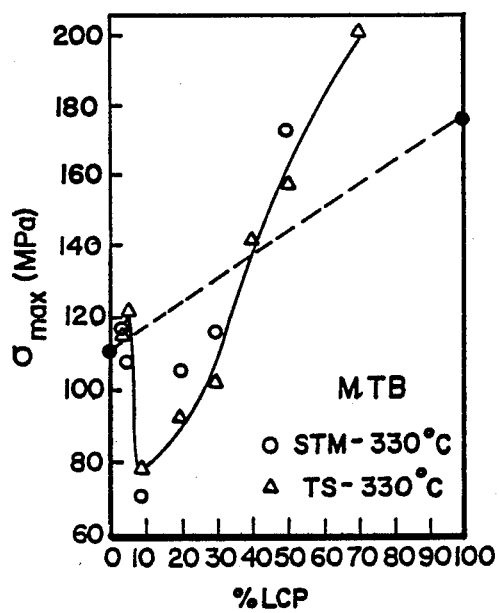
Figure 3:
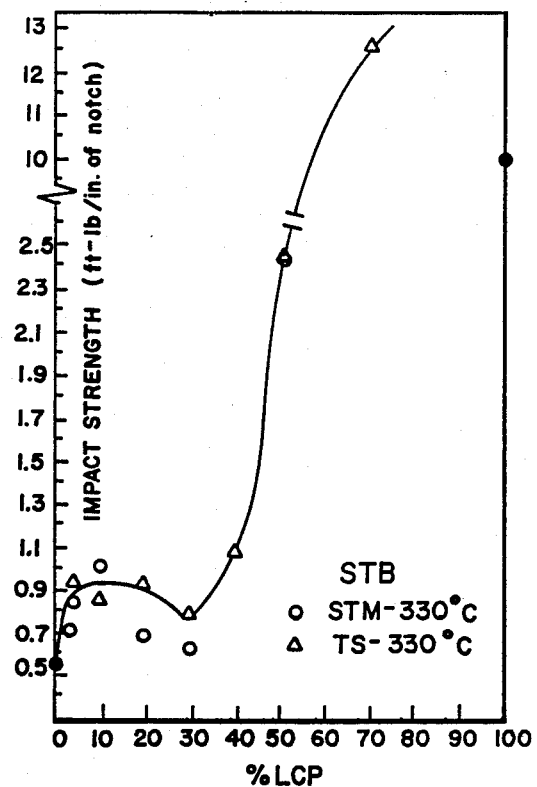
Figure 4:
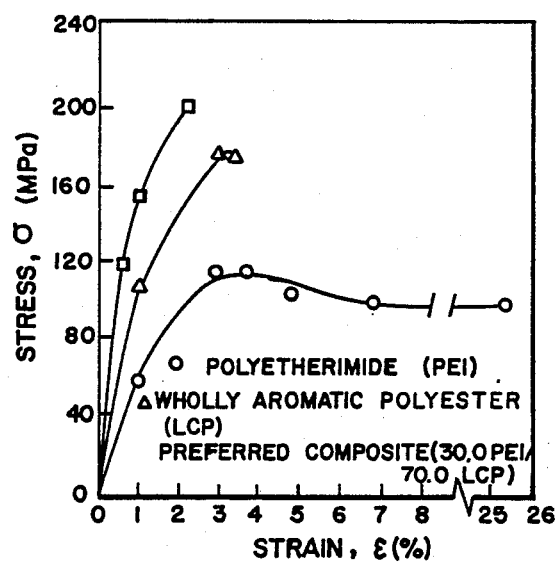
FIG. 4 shows the stress-strain curve of a preferred polymer composite according to this invention, i.e. one containing 30 percent by weight of polyetherimide and 70 percent by weight of wholly aromatic polyester. Also shown are the stress-strain curves of pure polyetherimide and pure wholly aromatic polyester.

Tensile modulus, tensile strength and notched Izod impact strength, all as functions of the weight percentage of wholly aromatic polyester (LCP) present in the composite, are shown graphically in FIGS. 1, 2 and 3 respectively. FIG. 4 shows stress-strain curves for a 30/70 PEI/LCP composite, pure PEI and pure LCP.

Abbreviations in FIGS. 1-4 are as follows:
E=modulus
σ=ultimate tensile strength
MTB=mini tensile bars
STB=standard tensile bars
STM=static mixer
TS=twin screw extruder Even a cursory inspection of FIGS. 1, 2 and 3 in TABLE I shows that physical properties of polyetherimide/wholly aromatic polyester composites according to this invention, i.e. those containing more than 40 percent or more by weight of wholly aromatic polyester, were markedly and unexpectedly superior to those of polyetherimide/wholly aromatic polyester composites previously known (those containing mo more than 30 percent by weight of wholly aromatic polyester).

EXAMPLE 2

This example describes the preparation of polyetherimide/wholly aromatic polyester composites in a single screw extruder followed by a Koch static mixer and extrusion die head. Results were generally similar to those obtained in Example 1.

The screw extruder used herein was a Killion 1 inch single screw extruder, sold by Killion Extruders Inc., of Riviera Beach, Fla. This extruder had five heating zones and the screw was rotated at 30 rpm. The first zone (at the inlet end) was maintained at 280° C., the other zones at 330° C. The adapter between the extruder and the Koch static mixer was also maintained at 330° C. by employing a separate heater-temperature controller system. The pressure at the static mixer entrance was recorded by making use of a built in pressure transducer.

Physical mixtures of polyetherimide and wholly aromatic polyester were made in the manner described in Example 1. These mixtures were then charged to the inlet end of the single screw extruder and processed therein as described above. Polymer blend exiting the die head at the outlet side of the Koch mixer was extruded as thin rods which were quenched with water at ambient temperature, the quenched rods were pelletized. The pellets were fed to a Newbury Model H2 40RS injection molding machine which was operated under the same conditions as in Example 1.

Samples of the extruded blends described herein were observed in a scanning electron microscope (SEM) as described in Example 1 and were found to be in the form of fibers of predominantly 3-5 microns in diameter. These fibers were oriented essentially in the direction of extrusion, were well distributed across the surface of the extrudate, and were nearly continuous in length. Tensile and impact tests were carried out in the manner described in Example 1. Results were given in TABLE II below.

For control purposes, samples of pure polyetherimide and pure wholly aromatic polyester were injection molded and tested in the same manner. Results are also given in TABLE II.

TABLE II

| Wt. Percent LCP | Tensile Modulus, GPa | Tensile Strength MPa | Elongation to break, % | Izod Impact Ft-Lb/In | Izod Impact J/m |
|---|---|---|---|---|---|
| 0 | 5.70 | 114.5 | 25.37 | 0.53 | 15.5 |
| 10 | 6.64 | 72.0 | 1.86 | 1.00 | 29.1 |
| 20 | 8.56 | 106.0 | 1.16 | 0.69 | 20.1 |
| 30 | 8.89 | 117.5 | 1.63 | 0.66 | 19.2 |
| 50 | 12.10 | 172.6 | 2.11 | 2.45 | 71.2 |
| 100 | 10.50 | 175.0 | 3.26 | 9.9 | 287.4 |

While in accordance with the patent statutes, a preferred embodiment and best mode has been presented, the scope of the invention is not limited thereto, but rather is measured by the scope of the attached claims.

What is claimed is:

1. A self-reinforced polymer composite comprising:
    (a) from 60 to about 5 percent by weight, based on total polymer weight, of polyetherimide, and
    (b) from 40 to about 95 percent by weight, based on total polymer weight, of a melt processable wholly aromatic polyester which is anisotropic in the melt phase,
   said polyester being essentially in the form of long, continuous, predominantly unidirectionally oriented fibers which are formed in situ in a matrix of said polyetherimide.

2. A polymer composite according to claim 1 comprising from 60 to about 25 percent by weight of said polyetherimide and from 40 to about 75 percent by weight of said wholly aromatic polyester, based on total polymer weight.

3. A polymer composite according to claim 1 comprising from about 50 to about 25 percent by weight of said polyetherimide and from about 50 to about 75 percent by weight of said wholly aromatic polyester, based on total polymer weight.

4. A polymer composite according to claim 1 in which said wholly aromatic polyester is thermotropic.

5. A polymer composite according to claim 1 containing at least about 50% by weight of said wholly aromatic polyester, based on total polymer weight.

6. A molded composite article formed from the polymer composite of claim 1.

7. A fiber which has been melt spun from the polymer composite of claim 1.

8. A film which has been melt extruded from the polymer composite of claim 1.

9. A process for preparing a self-reinforced polymer composite comprising a polyetherimide and a melt processable wholly aromatic polyester which is antisotropic in the melt phase, which comprises mixing said polyetherimide with from 40 to about 95 percent by weight, based on total polymer weight, of said melt processable wholly aromatic polyester at a temperature at which both polymers are melt processable, and under mixing conditions effective to give, on cooling, a polymer composite in which the wholly aromatic polyester is present in the form of predominantly unidirectionally oriented fibers in a matrix of said polyetherimide, extruding the resulting blend in the melt phase, cooling the blend and recovering a self-reinforced polymer composite comprising said polyetherimide and said wholly aromatic polyester, said wholly aromatic polyester being in the form of continuous predominantly unidirectionally oriented fibers in a matrix of said polyetherimide.

10. A process according to claim 9 in which the amount of said wholly aromatic polyester is from 40 to about 75 percent by weight, based on total polymer weight.

11. A process according to claim 9 in which the amount of said wholly aromatic polyester is from about 50 to about 75 percent by weight, based on total polymer weight.

12. A process according to claim 9 in which the mixing temperature of said polyetherimide and said wholly aromatic polyester is from about 300° to about 350° C.

13. A process according to claim 9 in which said wholly aromatic polyester is thermotropic.

14. A process according to claim 5 in which particles of said polyetherimide and said wholly aromatic polyester are mixed under conditions forming a physical mixture of said particles and then dried prior to said mixing at a temperature at which both polymers are melt processable.

15. A process according to claim 9 in which the amount of said wholly aromatic polyester is at least about 50% by weight, based on total polymer weight.

* * * * *